United States Patent Office 3,196,785
Patented July 27, 1965

3,196,785
LITHOGRAPHIC PLATE AND METHOD
OF MAKING SAME
Robert Louis Eissler, Muncie, Ind., assignor to Ball
Brothers Company, Incorporated, Muncie, Ind., a corporation of Indiana
No Drawing. Filed Aug. 12, 1963, Ser. No. 301,664
5 Claims. (Cl. 101—149.2)

This invention relates to a new and novel lithographic plate and to a novel method of making the plate. More particularly, the invention relates to a new aluminum lithographic plate and to a novel method for producing such a plate.

Years ago, lithographic plates generally were made from zinc sheets, however, more recently the use of aluminum lithographic plates has become widespread. While aluminum plates have certain advantages over the earlier zinc plates, one of which is cost, an important disadvantage of aluminum plates is that their press life is substantially shorter than that of zinc plates. For example, the press life of an aluminum plate may be 20,000 impressions or less before the plate loses its sharpness and clarity. While attempts have been made to improve the press life of aluminum plates, these efforts have provided only a partial solution to the problem.

In view of the shortcomings of aluminum plates heretofore, it was completely unexpected and surprising to discover a new and improved aluminum lithographic plate which has substantially greater press life than to date attainable with aluminum plates. Also, the new plate of the invention has improved resistance to scumming and performs successfully even under unfavorable press conditions such as pressure differences due to improper roll alignment and variations in the quantities and formulations of the inks and fountain solutions. Furthermore, the present invention provides a novel method for producing such plates, which method is simple and convenient and relatively low in cost.

In accordance with the present invention, a novel aluminum lithographic plate is produced by a method which comprises removing substantially all scale, oxides and other contaminants from th esurface of a grained aluminum plate, coating the cleaned grained surface with an aqueous composition of a water-soluble metal compound, which compound is convertible to a substantially insoluble form by the removal of water therefrom, and heating the coated plate at an elevated temperature to convert tfke coating to a substantially insoluble form.

An aluminum plate which previously has been grained with a brush and/or an abrasive slurry such as a mixture of pumice and quartz, is cleaned to remove any surface contaminants such as the graining media or particles of aluminum. Advantageously, the cleaning is accomplished by the use of an aluminum cleaning agent such as Oakite 33 sold by Oakite Products, Inc., New York, Haemo-Sol sold by Meinecke & Company, Inc., New York, etc. Preferably, the cleaning agent has a mild etching action on the metal surface so that not only loose contaminants are removed, but also contaminants adhering to the surface.

After the cleaning step is completed, the plate is preferably rinsed with water and then, while still wet, coated with an aqueous composition of a water-soluble metal compound which is convertible to a substantially insoluble form by the removal of water therefrom. Advantageously, the plate is immersed in the coating composition to insure substantially complete contact between the composition and the surface of the plate undergoing coating. Preferably, relative movement is maintained between the plate and the solution during the coating step. This may be accomplished either by movement of the plate in a stationary coating bath and/or agitation of the bath during the coating operation.

The coating composition of the present invention as mentioned above contains a water-soluble metal compound which converts to a substantially insoluble form when water is removed therefrom. The solubility of the soluble metal compound need not be great since only relatively small concentrations of the metal compound are generally employed in the coating composition. It is believed desirable to employ a metal compound of somewhat limited solubility in the coating composition with a portion of the compound being present as a colloidal dispersion or a dispersion of a finely divided gel. The metal compound advantageously is a hydroxy-containing compound which may be formed in situ in an aqueous solution, by the reaction of an acid salt with an alkaline material, etc. For example, an aqueous solution of titanium tetrachloride is believed to form a titanic acid of the formula $H_4TiO_4$ which upon dehydration converts to a substantially insoluble form, belived to be $H_2TiO_3$. In the same way various zirconium salts such as zirconium sulfate ($ZrOSO_4 \cdot H_2SO_4 \cdot 3H_2O$) may be reacted with ammonium hydroxide to form a hydroxy-containing zirconium compound. The employment of titanium tetrachloride solutions has been found to be particularly advantageous.

The concentration of the metal compound employed is generally less than about 5% by weight of the composition, for example, between about 0.1% and 5%. Advantageously, the concentration is maintained between about 0.25% and 3.5% and preferably between about 0.5% and 2% by weight of the composition.

After the coating step, the excess coating composition is rinsed from the plate and the plate is heated to an elevated temperature to dry the plate and to convert the coating thereon to a relatively insoluble form. The conversion of the coating generally requires that the coated plate be heated to a temperature above about 250° F. If desired, the drying and coating conversion may be performed as separate steps with the drying step being either air drying or slightly elevated temperature drying and the conversion of the coating to an insoluble form being at a higher temperature.

The coated aluminum lithographic plates of the present invention are suitable for use in conventional wipe-on and presensitized plate lithographic processes. In the wipe-on process, an image would be produced on a coated plate by the application of a photosensitive coating to the surface of the coated plate and the subsequent exposure, development and fixing of the image thereon. In the manufacture of presensitized plates, a photosensitive coating would be applied to the coated plate by the manufacturer rather than by the printer.

The following examples illustrate several embodiments of the present invention and are not intended to restrict the scope of the invention. In the examples, parts and percent of materials are by weight.

*Example I*

An aluminum plate of a size of about 20 inches by 23 inches and a thickness of about 0.01 inch which previously had been brush grained, was cleaned by immersing the plate for about 15 seconds into a 5% aqueous solution of Oakite 33 maintained at about 175° F. Oakite 33 is an aluminum cleaning agent sold by Oakite Products Inc., New York. Following the cleaning step, the plate was rinsed with water and dipped into an aqueous composition containing 1% of titanium tetrachloride at about room temperature. After about 2 minutes, the plate was removed from the composition, rinsed with water, air dried and heated in an oven maintained at a temperature of about 250° F. for approximately 5 minutes.

Plates coated according to the above method were processed with uncoated plates in conventional wipe-on processes. In press tests comparing the life of uncoated plates with plates coated in accordance with the invention, the coated plates had press runs of 60,000 impressions or more whereas the uncoated plates had press runs in the range of about 20,000 impressions.

*Example II*

An aluminum plate of a size about 11 inches by 18 inches and a thickness of about 0.01 inch which previously had been brush grained was cleaned by immersing the plate in an aqueous cleaning solution maintained at a temperature of about 175° F. and containing about 1% of Haemo-Sol, sold by Meinecke and Company, Inc., New York. After about 20 seconds, the plate was removed from the solution, rinsed with water and immersed in a coating composition. The coating composition was formed by dissolving zirconium sulfate ($ZrOSO_4 \cdot H_2SO_4 \cdot 3H_2O$) in water and adding dropwise thereto an aqueous ammonia solution until a precipitate formed. The precipitate was then filtered from the solution and washed with water until no odor of ammonia remained. About 1% of the precipitate was mixed with water to form the coating composition.

After the plate had been immersed in the coating composition for about one minute the plate was removed, rinsed with water and placed in an oven maintained at a temperature of about 250° F. for approximatley five minutes. A number of plates coated as above were then processed with uncoated plates in conventional wipe-on processes. Press tests comparing the press life of uncoated plates with coated plates showed that the coated plates had press runs substantially greater than the press runs of uncoated plates.

*Example III*

The procedure of this example was the same as that of Example I except that the coating composition contained about 3% titanium tetrachloride, and the plate was immersed for about one minute. In addition, the temperature of the composition was maintained at about 120° F. The resulting coated plates were treated and found to have substantially improved press life over that of uncoated plates similar to the results of Example I.

The above discussion shows that the present invention provides a new and improved aluminum lithographic plate which has substantially greater press life than heretofore was attainable with aluminum plates. Moreover, the new plate of the invention has improved scumming resistance and performs successfully under unfavorable press conditions such as variations in the quantities and composition of inks and fountain solutions and differences in roll pressure due to improper alignment. Furthermore, the invention provides a simple and convenient method for producing such plates which is relatively low in cost. Thus, the present invention overcomes the shortcomings of previously employed aluminum plates while retaining the important advantage of lower cost over other types of plates.

It will be apparent from the above discussion that various modifications in the specific procedures described in detail herein may be made within the scope of the invention. Therefore, the invention is not intended to be limited to the specific procedures described except as may be required by the following claims.

What is claimed is:

1. A method of producing an aluminum lithographic plate having improved press life which comprises cleaning a grained aluminum plate to remove surface contaminants therefrom; coating the cleaned surface with an aqueous titanium tetrachloride composition; and heating the coated plate at an elevated temperature to convert the coating to a substantially insoluble form.

2. A method of producing an aluminum lithographic plate having improved press life which comprises cleaning a grained aluminum plate to remove surface contaminants therefrom; coating the cleaned surface with an aqueous composition comprising between about 0.1% and 5% of titanium tetrachloride; and heating the coated plate at an elevated temperature to convert the coating to a substantially insoluble form.

3. A method of producing an aluminum lithographic plate having improved press life which comprises subjecting a grained aluminum plate to a mild etching action to remove surface contaminants therefrom; rinsing said plate with water; while the cleaned surface is wet with water, coating it with an aqueous composition comprising between about 0.1% and 5% by weight of titanium tetrachloride; removing the excess composition from said surface; and heating the coated plate to a temperature above about 250° F. to convert the coating to a substantially insoluble form.

4. A method of producing an aluminum lithographic plate having improved press life which comprises subjecting a grained aluminum plate to a mild etching action to remove surface contaminants therefrom; rinsing said plate with water; while the cleaned surface is wet with water, coating it with an aqueous composition comprising between about 0.25% and 3.5% by weight of titanium tetrachloride; removing the excess composition from said surface; and heating the coated plate to a temperature above about 250° F. to convert the coating to a substantially insoluble form.

5. A method of producing an aluminum lithographic plate having improved press life which comprises subjecting a grained aluminum plate to a mild etching action to remove surface contaminants therefrom; rinsing said plate with water; while the cleaned surface is wet with water, coating it with an aqueous composition comprising between about 0.5% and 2% by weight of titanium tetrachloride; removing the excess composition from said surface; and heating the coated plate to a temperature above about 250° F. to convert the coating to a substantially insoluble form.

References Cited by the Examiner

UNITED STATES PATENTS

| | | | |
|---|---|---|---|
| 2,814,988 | 12/57 | Bradstreet et al. | 101—149.2 |
| 2,983,221 | 9/61 | Dalton et al. | 101—149.2 |

DAVID KLEIN, *Primary Examiner.*

WILLIAM B. PENN, *Examiner.*